US012670812B2

(12) United States Patent
Baranowitz

(10) Patent No.: US 12,670,812 B2
(45) Date of Patent: Jun. 30, 2026

(54) EDUCATIONAL INTERACTIVE VIDEO GAMES ABOUT ORGANISM IMMUNITY TO TOXINS OR INFECTIONS INCLUDING CORONAVIRUS DISEASE

(71) Applicant: Steven Baranowitz, Wyncote, PA (US)

(72) Inventor: Steven Baranowitz, Wyncote, PA (US)

(*) Notice: Subject to any disclaimer, the term of this patent is extended or adjusted under 35 U.S.C. 154(b) by 482 days.

(21) Appl. No.: 18/025,669

(22) PCT Filed: Sep. 15, 2021

(86) PCT No.: PCT/US2021/050354
§ 371 (c)(1),
(2) Date: Mar. 10, 2023

(87) PCT Pub. No.: WO2022/060759
PCT Pub. Date: Mar. 24, 2022

(65) Prior Publication Data
US 2023/0343242 A1     Oct. 26, 2023

Related U.S. Application Data

(60) Provisional application No. 63/078,448, filed on Sep. 15, 2020.

(51) Int. Cl.
*A63F 13/52*     (2014.01)
*A63F 13/56*     (2014.01)
(Continued)

(52) U.S. Cl.
CPC ............. *G09B 23/30* (2013.01); *A63F 13/52* (2014.09); *A63F 13/56* (2014.09); *A63F 13/58* (2014.09);
(Continued)

(58) Field of Classification Search
CPC ......... G09B 23/30; G09B 5/065; A63F 13/56; A63F 13/52; A63F 13/58; G06T 19/20
See application file for complete search history.

(56) References Cited

U.S. PATENT DOCUMENTS

2006/0105825 A1* 5/2006 Findlay .................. A63F 13/79
463/4

OTHER PUBLICATIONS

International Preliminary Report on Patentability mailed Mar. 30, 2023 for PCT/US2021/050354, 7 pages.
(Continued)

*Primary Examiner* — Yingchuan Zhang
(74) *Attorney, Agent, or Firm* — Potomac Law Group, PLLC; Joseph F. Murphy; Ido Rabinovitch

(57)     ABSTRACT

A system and method for an interactive video game system for educating at least one player about organism immunity to toxins or infections using a video game. The video game system utilizes a video game server and associated database, and wherein the server includes a processor which executes software stored on the database for generating virtual human body organs, immunity system cells and organisms, toxins, and viruses that have invaded a human body ("invaders") and all of which interact in a manner that mimics a human body's immune system response. The at least one player computer device has a display screen and a user interface to permit the at least one player to interact with the video game server to configure a virtual immune system generated by said video game server to stop an attack by the invaders and to score points based on how successful the at least one player is in stopping said attack.

21 Claims, 22 Drawing Sheets

(51) Int. Cl.
    *A63F 13/58*         (2014.01)
    *G06T 19/20*        (2011.01)
    *G09B 5/06*         (2006.01)
    *G09B 23/30*       (2006.01)

(52) U.S. Cl.
    CPC ............. *G06T 19/20* (2013.01); *G09B 5/065*
           (2013.01); *G06T 2219/2004* (2013.01)

(56)           References Cited

OTHER PUBLICATIONS

International Search Report for PCT/US21/50354 mailed on Feb. 10, 2022.
Written Opinion of the International Searching Authority for PCT/US21/50354 mailed Feb. 10, 2022.

* cited by examiner

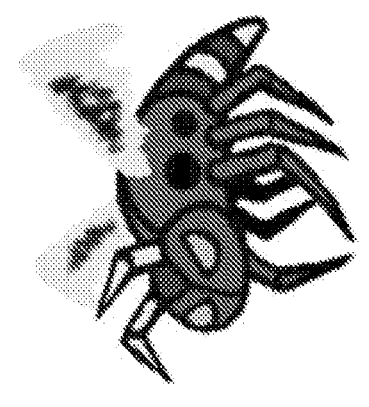
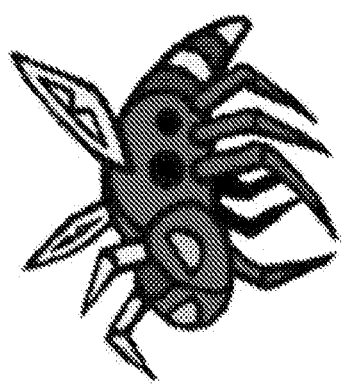
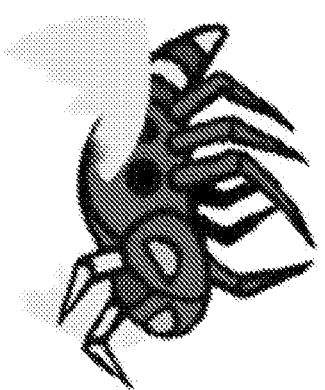
Fig. 7

| Friendly Units | SPEED | DAMAGE | RANGE | ATTACK SPEED | ATTACK MODE | Hit Points | $$ | Respawn | SPECIAL FEATURE |
|---|---|---|---|---|---|---|---|---|---|
| Macrophage | M | L | M | L | Single Target | L | L | H | N/A |
| Giant Cell | L | M | M | L | Single Target | M | M | H | N/A |
| Neutrophil | H | L | H | M | Area of Effect | L | L | M | N/A |
| Basophil | H | M | M | H | Area of Effect | L | M | M | N/A |
| Eosinophil | M | L | M | L | Single Target | L | M | M | 4x damage to parasites |
| Natural Killer Cell | H | M | M | H | Single Target | M | H | M | Target converted cells |
| Dendritic Cell | L | N/A | L | N/A | Single Target | L | H | H | Boost friendly units |
| B-Cell | H | N/A | H | L | Single Target | M | H | M | De-buffs enemies |
| T-Cell | N/A | H | M | M | Single Target | H | H | M | Only attacks marked enemies |

H = High
M = Medium
L = Low
N/A = not applicable

Fig. 9

Crona virus is head

EDUCATIONAL INTERACTIVE VIDEO GAMES ABOUT ORGANISM IMMUNITY TO TOXINS OR INFECTIONS INCLUDING CORONAVIRUS DISEASE

CROSS-REFERENCE TO RELATED APPLICATIONS

This application is a 35 U.S.C. 371 national stage of International Application No. PCT/US2021/050354, filed on Sep. 15, 2021, which claims priority to application Ser. No. 63/078,448 filed on Sep. 15, 2020, the contents of which are hereby incorporated by reference.

BACKGROUND OF THE INVENTION

This present invention relates to an educational game, namely, interactive video games with an educational focus on teaching the game players all about organism immunity to toxins or infections, including Coronavirus Disease (COVID).

Interactive video gaming technology is highly developed and immerses players or "garners" into an unlimited number of interesting, fun and/or challenging experiences or environments. One style of video game that is easily recognizable by gamers is known as "tower defense" video games. The gaming industry defines "tower defense" as a particular style of "real-time strategy" video games, the goal of which is to defend a player's territories or possessions by obstructing the enemy attackers, usually achieved by placing defensive structures on or along their path of attack. This typically means building a variety of different structures that serve to automatically block, impede, attack or destroy enemies. Strategic choice and positioning of defensive elements is an essential strategy of the genre.

One very popular tower defense video game is "Kingdom Rush." This video game involves medieval themes and provides gamers with four types of towers they can erect, upgrade and preserve, assuming that they earn sufficient money to build them and to protect them from enemy attack. Similar, tower defense video games are Bloons Tower Defense and Sid Meier's Civilization Series.

In view of the foregoing, Applicant recognized that these tower defense themes and tools can be directly applied to the physiology of a living organism's immunity system in defending itself against toxins and infections.

Thus, there remains a need for an educational video game that teaches players all about the immunity system in a fun and engaging manner using a tower defense style of play. Furthermore, in the current pandemic environment of Covid-19, educating people about this virus can assist in dispelling fear and help gamers cope with it. The present invention solves this problem.

All references cited herein are incorporated herein by reference in their entireties.

BRIEF SUMMARY OF THE INVENTION

An interactive video game system for educating at least one player about organism immunity to toxins or infections using a video game is disclosed. The video game system comprises: a video game server and associated database, wherein the server comprises a processor which executes software stored on the database for generating virtual human body organs, immunity system cells and organisms (e.g., single cell, multi-cell, etc.), toxins, and viruses that have invaded a human body, the organisms, toxins and viruses being referred to as "invaders" and all of which interact in a manner that mimics a human body's immune system response; and at least one player computer device having a display screen and a user interface to permit the at least one player to interact with the video game server to configure a virtual immune system generated by the video game server to stop an attack by the invaders and to score points based on how successful the at least one player is in stopping the attack.

A method for educating at least one player about organism immunity to toxins or infections using an interactive video game is disclosed. The method comprises: providing a video game server and associated database, wherein the server comprises a processor which executes software stored on the database for generating virtual human body organs, immunity system cells and organisms (e.g., single cell, multi-cell, etc.), toxins, and viruses that have invaded a human body, said organisms, toxins and viruses being referred to as "invaders" and all of which interact in a manner that mimics a human body's immune system response; connecting at least one player computer device, having a display screen and a user interface, over a network to permit the at least one player to interact with the video game server; and configuring a virtual immune system generated by the video game server to stop an attack by the invaders and to score points based on how successful the at least one player is in stopping said attack.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 7 is an exemplary video graphic of the B Cells as used in the IW;

FIG. 9 provides a summary of the characteristics of the various Friendly Units used in the IW;

FIG. 15 is an exemplary screen shot showing before the wave begins, the player can view the direction the blood cells are flowing in order to determine which sections of the level the invading cells will come from;

DETAILED DESCRIPTION OF THE PREFERRED EMBODIMENTS

Figure 1:
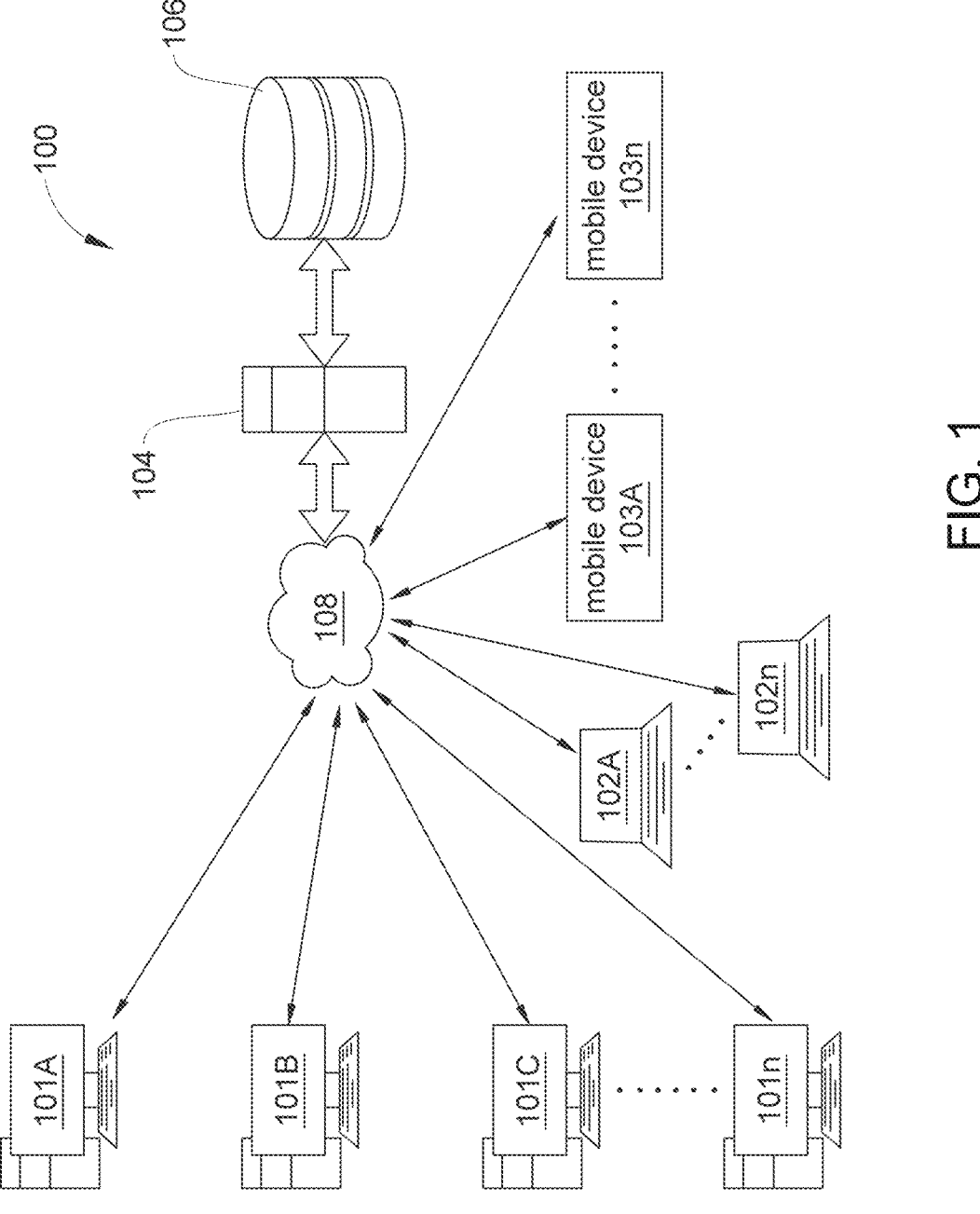
FIG. 1 is a network diagram for the Immunity Warriors and Covi Fighters Interactive Video Games of the present invention.

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

The following interactive video games may be categorized as "edu-tainment turn-based strategy/tower defense games" that are used to teach players, preferably young adults in grades 8-12, but also adults in general, about the how the immune system works on a basic level against toxins or infections, including Coronavirus Disease (COVID). As such, two interactive video games are disclosed below, one directed educating players on how the immune system works on a basic level against toxins or infections, hereinafter known as "Immunity Warriors" and the other directed to educating players on how the immune system works to defend against Coronavirus Disease (COVID), hereinafter known as "Covi Fighters."

Both Immunity Warriors (IW) and Covi Fighters (CF) are interactive video games comprising a type of strategy game where the player must defend an objective from attacking microorganisms by placing defensive structures or characters along or on the enemies' path of attack. It should be noted that unit-based tower defense games, such as the one described herein, are something that is very uncommon for typical tower defense games and both the IW and CF interactive video game inventions of the present application add a lot of additional strategy and complexity. It shifts the focus of the game from building up general defenses to a numbers game where the player needs to not only consider the strength of their towers but the available units they have as well. Additionally, tower defense games generally tend to treat both player towers and enemy units as expendable while in this game they are the focus as they are meant to educate the users on their real-life counterparts' functionality. Because of this, there is a need to develop and teach this which has involved things like creating screens to educate readers on the towers' names and purposes and implementing special in game scenarios where special units are needed to combat specific enemy units.

FIG. 1 depicts an illustrative video game network 100 for both Immunity Warriors and Covi Fighters and comprises a plurality of end users ("players") that may comprise computer workstations 101A-101*n*, laptops 102A-102*n*, mobile devices 103A-103*n* (e.g., tablets or smartphones), and any other type of end user networked electronic device, with the "n" in the reference numbers indicating an unlimited number of end user devices. These players are linked to the Internet 108 (either wirelessly or wired) to an Immunity Warriors video game system server 104 which is in communication with a video game database 106. The server 104 may host a website, gaming interface or otherwise for users of the devices to access via the network 100. The video game system server 104 comprises a processing unit that executes software to provide for the features and functions (e.g., modules) described herein. The processing unit is in communication with a memory, input/output unit, and the database storage 106 which comprises one or more data repositories. It should be understood that the processing unit, memory, I/O unit, and database 106 may be particularly configured when executing software to perform the video game and other functionality, as described herein.

User interfaces may access system services to perform data transformations, provide gaming functionality, store data, and retrieve data using server data repositories 106, which may be in the form of a relational database. This network 100 architecture may support any number of interfaces and in this way, the flexible, scalable architecture allows the network system 100 to serve the needs of a large player population. The video game system may be set up to support up to millions of players to play simultaneously. The video game system may operate within the context of an individualistic structure, a competitive structure, and/or a cooperative structure, as further described herein.

Figure 2:
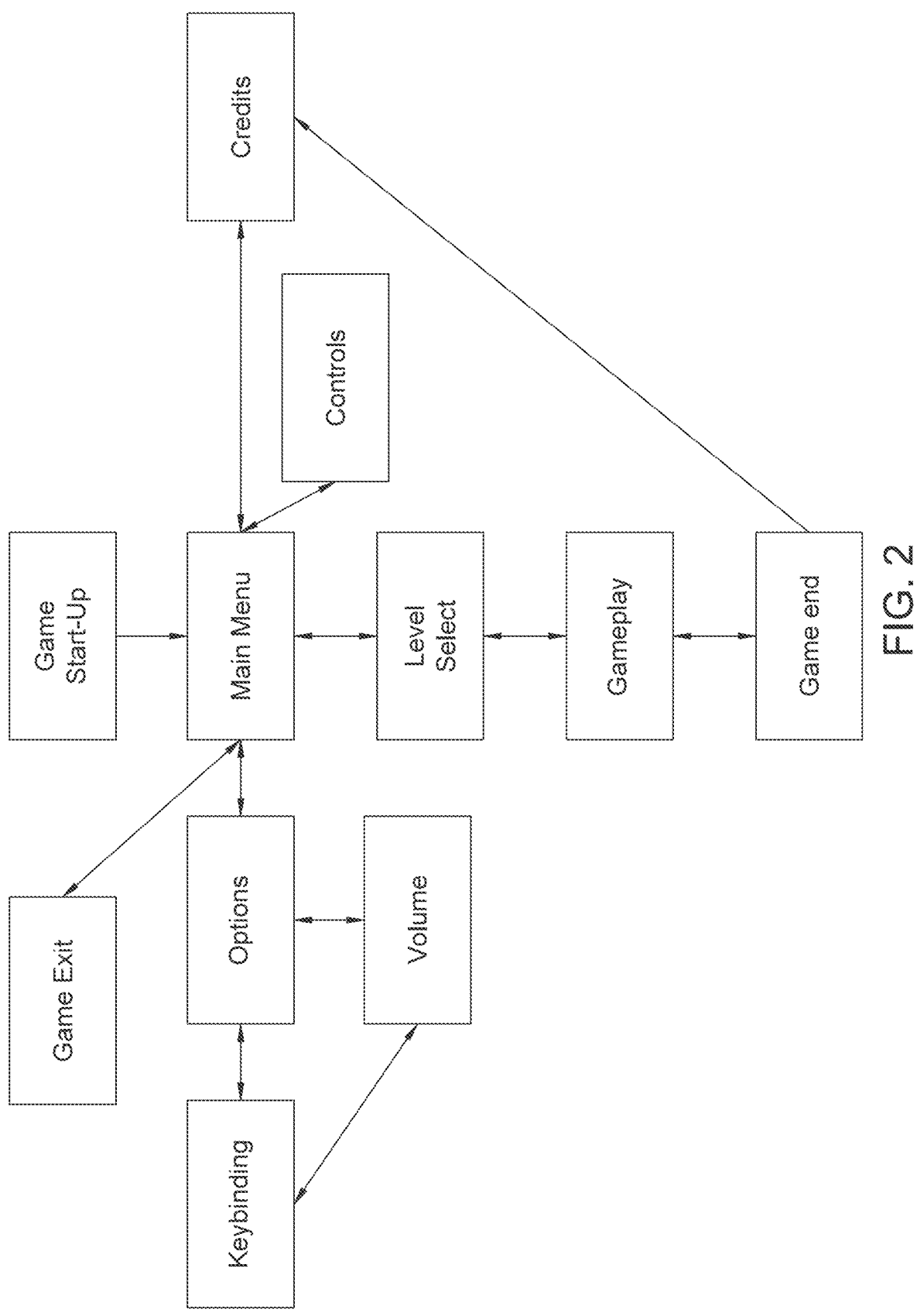
FIG. 2 is a game flow diagram for the Immunity Warriors (IW) and Covi Fighters (CF) Interactive Video Games of the present invention.

FIG. 2 depicts the overall game flow for both the Immunity Warriors Interactive Video Game and the Covi Fighters Interactive Video Game. As can be seen, there is a game start-up module that leads into the Main Menu module. A level select module allows players to choose a level (e.g., players in the Immunity Warriors Interactive Video Game may want to play the game in a faster mode, etc.). Once a level select is made, the player enters the gameplay until it ends in the game end module. It should be noted that from the Main Menu, several additional modules are available therefrom. For example, game controls may be modified using the Controls module and video game credits can be viewed in the Credits module. A Keybinding module allows the optimization of gameplay by permitting the customization of the controls of the games for individual players which works through an Options module, which permits a variety of other features such as increasing video game volume through a Volume module. Finally, the video games can be exited directly from the Main Menu via a Game Exit module.

Immunity Warriors Interactive Video Game (IW) 20

The player is in control of the immune system of a middle school boy who repeatedly comes into contact with foreign pathogens. It is the player's task as the immune system to defend each part of the body at risk by deploying an array of different cells to deal with the incoming threats in a strategic manner.

The following provides key features of the IW 20:

IW 20 Theme/Setting

IW 20 is based on the basics of the immune system and how it defends from foreign invaders;

IW 20 is a unit-based tower defense where waves of enemies (various bacteria and pathogens) traverse down a path and try to break past defensive units the player set up prior to each wave starting; and The entire game of IW 20 occurs in one person's body with each stage occurring in different parts of the body.

IW 20 Description

Single screen view of entire gameplay field;

Simple UI (user interface) allows player to create towers which deploy units (the player's main form of defense);

Informational blurbs about what the units are and their functions appear periodically (e.g., x Cells release a gas which dissolves x type of bacteria); and Tapping an already built tower space shows buildable towers.

IW 20 Core Gameplay Mechanics

Player manages the creation of different cell units as "towers";

Different cell towers have different units or effects and are effective against different types of bacteria;

Use specific units to defeat specific enemies;

Players must learn what specific cells do to be able to determine what enemies they destroy (MAIN FOCUS).

Player has to focus on changing antibodies and strategically placing them to deal with threats accordingly;

Goal is to survive the waves by not letting a set amount of bacteria past the defenses;

Waves are not endless, so players must survive all waves before progressing to the next level;

Manufacture units; and

Manage ATP (Adenosine Triphosphate, a molecule that carries energy within cells and is used in IW 20 as in-game currency) and map space to devise best way of placing towers and moving units to protect the body.

IW 20 Player Units

Each player strategizes on the best use of "structures" (also referred to as "player units" discussed below) for combating the invading micro-organisms (referred to as "Enemies," discussed below) based on the understanding that cells are produced by the immune system and these "structures" can be placed by the player along an Enemy's (or Enemies') path. Each structure is unique and has different abilities. The strategy lies in using the appropriate tower to counteract the unique abilities of Enemies and wherein each tower can be upgraded to create more powerful defenses.

Player units consist primarily of towers that they place by using ATP. Each tower (also referred to as "Friendly Units") falls into one of two categories: (A) Innate or (B) Adaptive.

(A) Innate—innate towers are useful for quick, low cost, non-precise defenses. Their build time is very low in comparison to adaptive towers. They cost much less than the others. They are generally well-rounded and can deal with most bacteria fairly well, but if a horde of very strong bacteria attacks, they will need help. The main types of innate towers are towers that generate: Macrophages, Giant Cells, Neutrophils, Basophils, Eosinophils, Natural Killer Cells, and Dendritic Cells.

Figure 3:
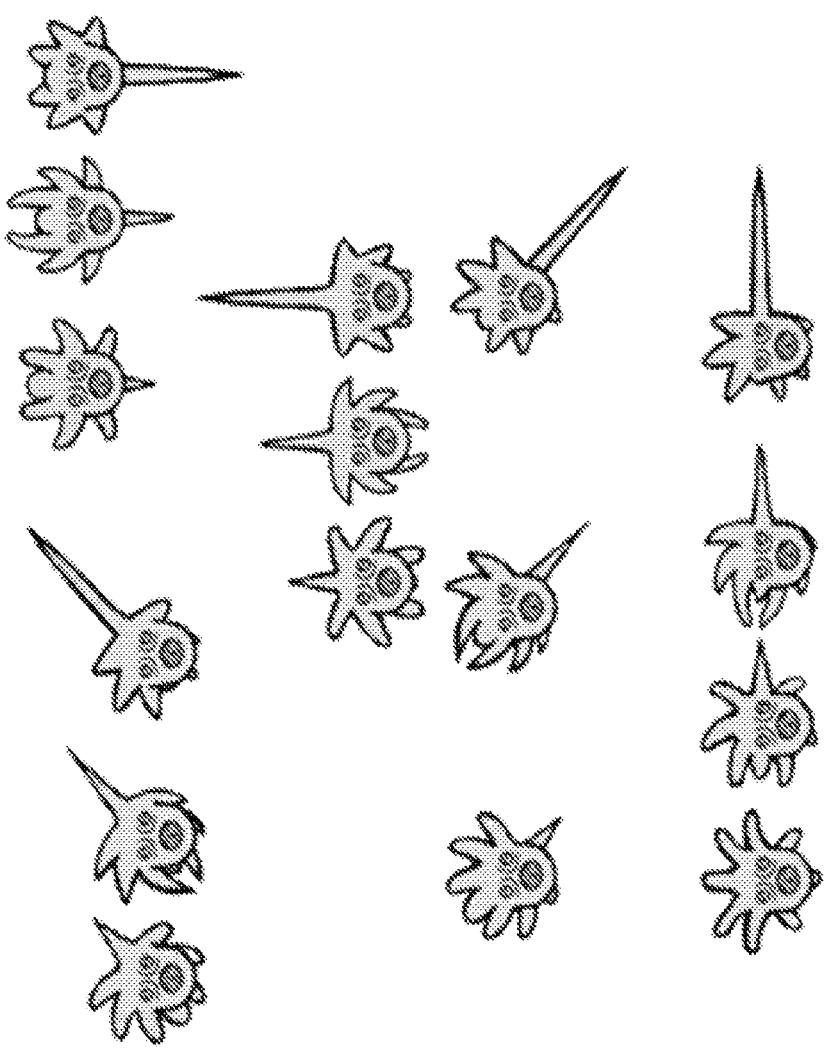
FIG. 3 is an exemplary video graphic of the Friendly Unit Macrophages as used in the IW.

1. Macrophages are defense against general threats. They attack everything for low damage. Single target attacks, no area of effect, with a low attack speed, low damage output, and low amount of hit points. On the plus side, they are a low-cost tower and have a quick respawn rate. An exemplary video graphic of the Macrophages as used in the IW 20 are depicted in FIG. 3.

2. Giant Cells, being that they are technically masses of merged macrophages, are the next defensive tier up from macrophages. They do increased damage and have more health at the cost of having a lower move/attack speed. They will also cost more than macrophages. They share the same respawn rate as macrophages. These can be selected for "basic attack."

3. Neutrophils are small, fast, innate defense cells. They have a higher range than macrophages/giant cells and attack enemies with a ranged Area of effect chemical attack that hits for low damage. Neutrophils have a ranged "area of attack" (AOE) which typically means attacks that can affect multiple targets within a specified area.

4. Basophils function similarly to neutrophils but are stronger and faster at the cost of having a lower range and requiring more ATP to be bought. Basophils also have a ranged AOE.

Figure 4:
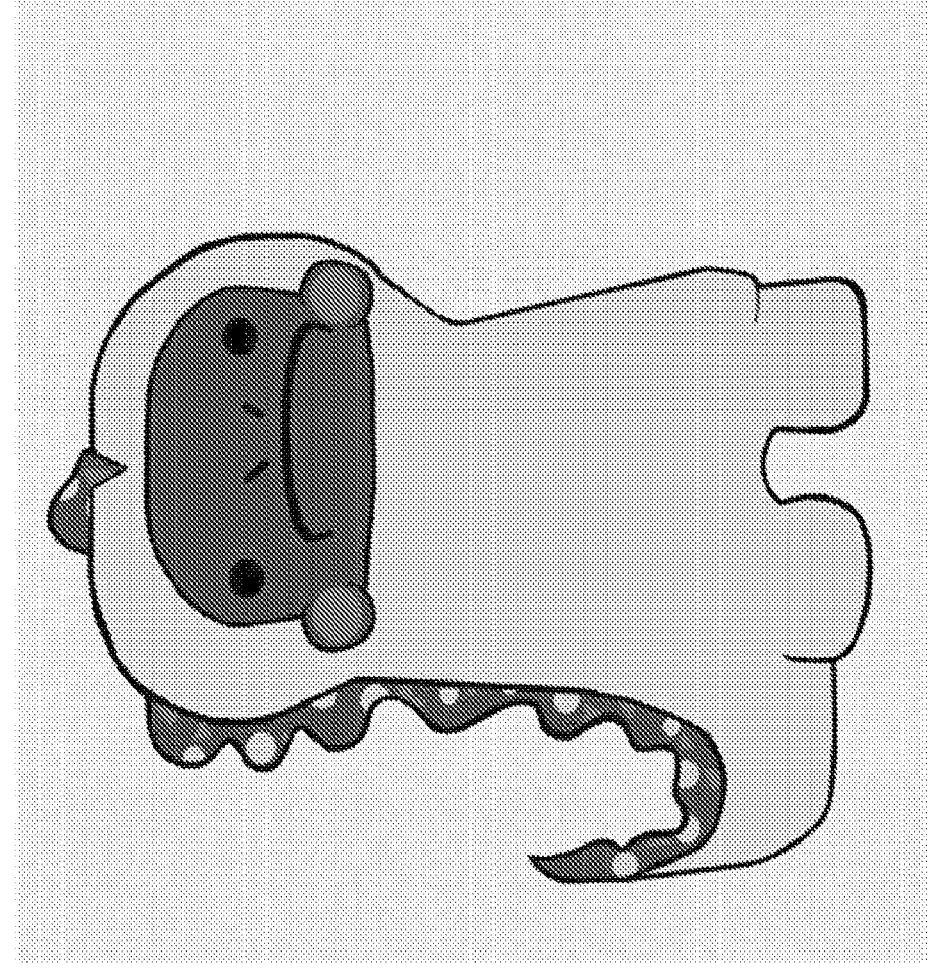
FIG. 4 is an exemplary video graphic of the Friendly Unit Eosinophils as used in the IW.

5. Eosinophils have the same attack rate and amount of health as a Macrophage. They deal low damage to all enemies, except multicellular parasites, like tapeworms. If attacking one of these, their damage output is quadrupled. They attack in a single target fashion, but if attacking a multicellular parasite, they will do an Area of effect cleave that deals their full bonus damage to all parasite cells hit. The quadruple damage multiplier only applies to parasitic cells hit by the cleave. Like Giant Cells, Eosinophils can also be selected for basic attack. An exemplary video graphic of the Eosinophils as used in the IW 20 are depicted in FIG. 4.

Figure 5:
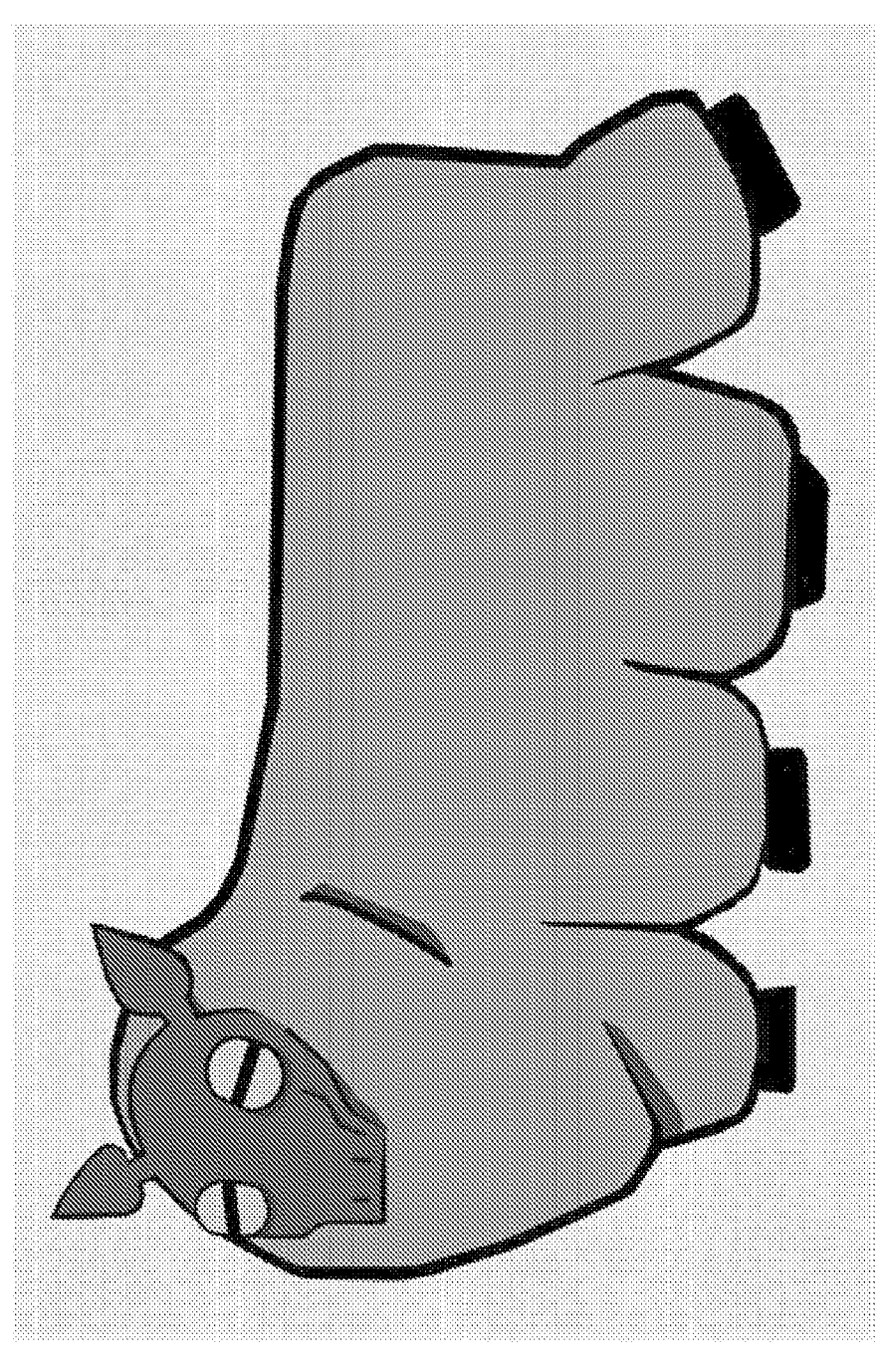
FIG. 5 is an exemplary video graphic of the Friendly Unit Natural Killer Cells as used in in the IW.

6. Natural Killer Cells only attack "Converted Cells" and "Converter Cells", a unique type of enemy that will spawn with a wave, or be one of your cells that was converted. Natural Killer Cells deal fair damage. They have single target attacks, have an ok amount of health, and move faster than Macrophages. They also have a high attack speed. An exemplary video graphic of the Natural Killer Cells as used in the IW 20 are depicted in FIG. 5.

Figure 6:
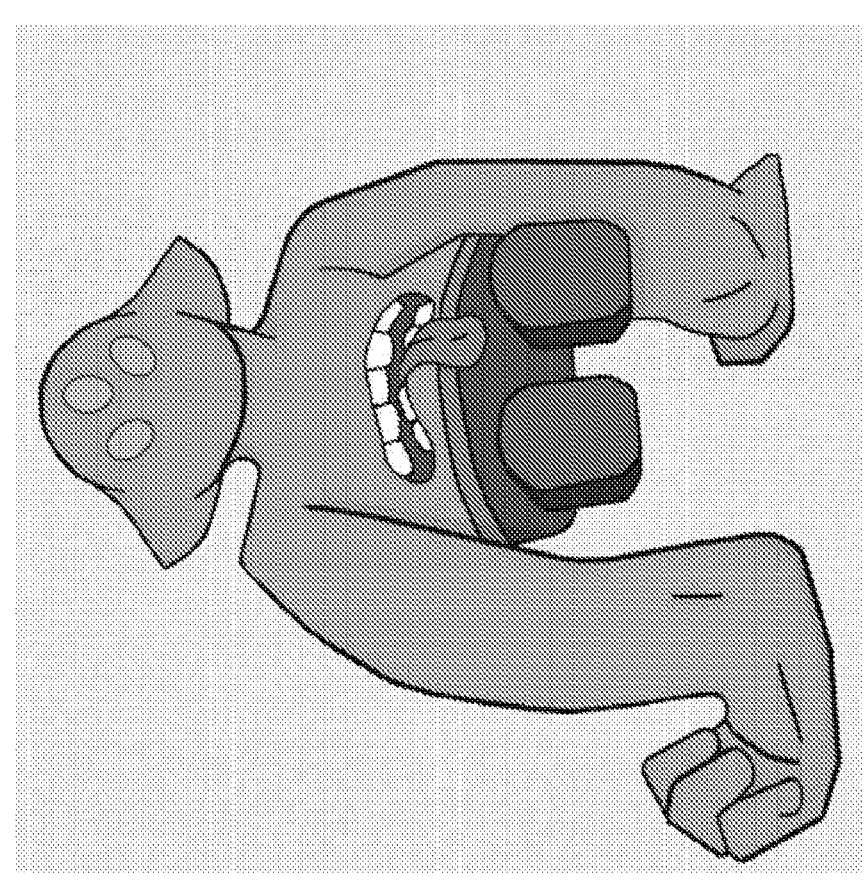
FIG. 6 is an exemplary video graphic of the Friendly Unit Dendritic Cells as used in the IW.

7. Dendritic Cells that are produced will move in a straight line to nearby towers providing them a temporary power up. Upon reaching the tower, they speed up the production rate of the tower or anything the tower is building. A dendritic cell will not move to a tower that has already received a temporary increase in production speed. Dendritic Cells have low health and speed, while also having a long respawn time. Dendritic Cells act as "support units." An exemplary video graphic of the Dendritic Cells as used in the IW 20 are depicted in FIG. 6.

(B) Adaptive—adaptive towers are useful for tackling very strong enemy cells. Having a combination of adaptive towers makes them do much more damage to incoming pathogens than innate towers can do. However, adaptive units can only target specific types of enemies in addition to costing more ATP to build and requiring more time to build. These cells consist of B Cells and T Cells.

1. B Cells mark specific pathogens massively increasing the amount of damage they take. Marked enemies will be distinct with a glowing effect until the tag wears off. Damage taken while the tag is active is doubled. B Cells cannot be killed before they mark an enemy. B Cells have high range and movement speed. B Cells can "debuff and prime for "bigger explosion." An exemplary video graphic of the B Cells as used in the IW 20 are depicted in FIG. 7.

Figure 8:
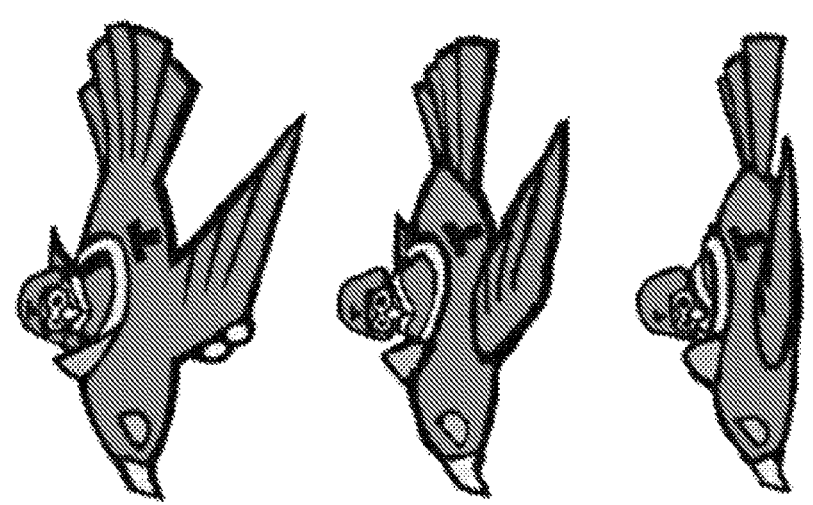
FIG. 8 is an exemplary video graphic of the T Cells as used in the IW.

2. T Cells can only attack Enemies that have been marked, and do high damage to single targets. T Cells, do considerable damage in addition to having a lot of health and medium range. T Cells can be categorized as providing for "explosive damage" to Enemies. An exemplary video graphic of the T Cells as used in the IW 20 are depicted in FIG. 8.

FIG. 9 provides a summary of the characteristics of the various Friendly Units and represent commonly-used in-game statistics. The following comments are made regarding several of the characteristics. In particular, "Attack Speed" is a statistic that determines how quickly a unit can dish out attacks; in contrast "Speed" is a statistic that determines how quickly a unit can move around and is unrelated to attacking. The "Hit Points" corresponds to the "health" of a unit and represents the amount of times they can be hit by enemy attacks before being defeated. Typically, the "N/A" designator indicates that the unit is stationary and cannot move.

IW 20 Enemy Units

Figure 10:
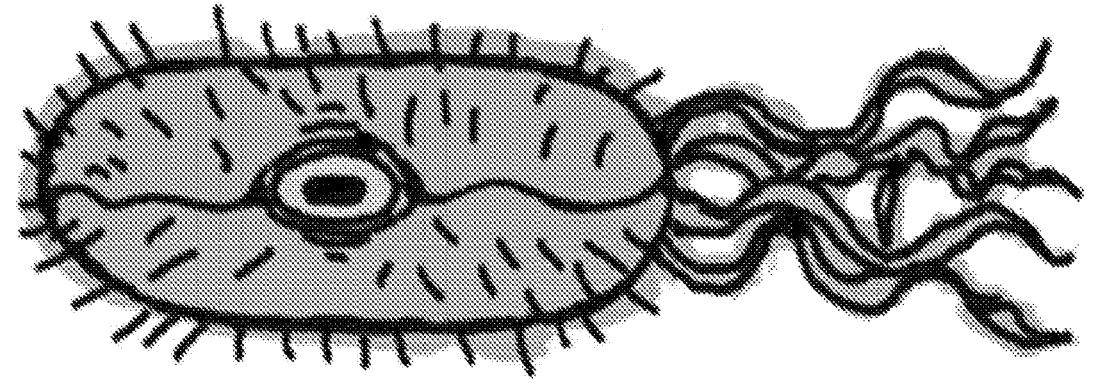
FIG. 10 is an exemplary video graphic of the Bacteria as used in the IW.

The "Enemies" in the IW 20 comprise invading micro-organisms (e.g., virus, bacteria, phages, etc.) that move along predetermined paths within the human body and wherein each Enemy has different abilities and attributes. These Enemies can be typed as follows:

Bacteria (e.g., staff infection, Strep, *E-coli*); an exemplary video graphic of the Bacteria as used in the IW 20 are depicted in FIG. 10.

Figure 11:
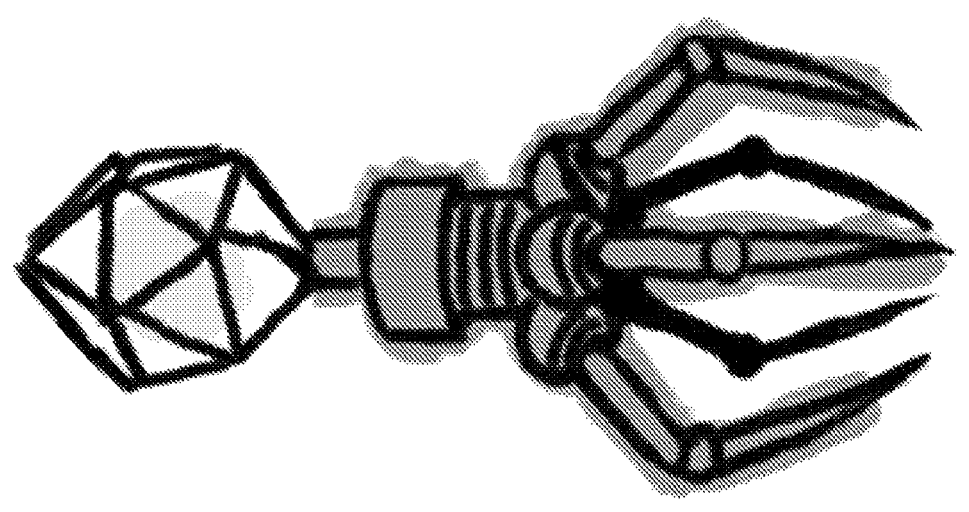
FIG. 11 is an exemplary video graphic of the Virus as used in the IW.

Virus (e.g., influenza, dengue virus, hepatitis B); an exemplary video graphic of the Virus as used in the IW 20 are depicted in FIG. 11.

Fungi (e.g., candidiasis, sporotrichosis, *cryptococcus*); and

Parasites (e.g., malaria, leishmaniasis, tape worm, pin-worm, schistosomiasis).

Figure 12:
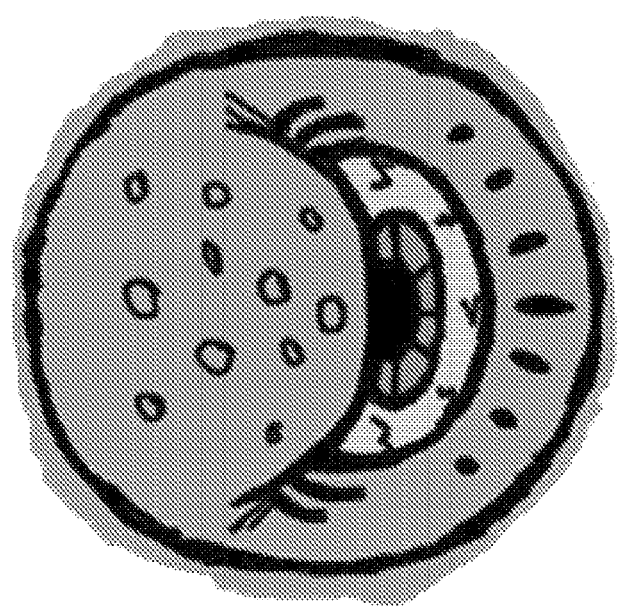
FIG. 12 is an exemplary video graphic of the Fungi or Parasites as "Invaders" as used in the IW.

An exemplary video graphic of the Fungi or Parasites as "Invaders" as used in the IW20 are depicted in FIG. 12.

Also referred to as "Enemy units," these Enemy units will spawn at the beginning of each wave and make their way down a set path to the spot that the player is trying to defend. Upon reaching the point, the enemy will deal a set amount of damage to the player based on what type of enemy they are. As the difficulty increases, enemy units will begin to spawn with stronger stats compared to their basic forms and inflict more damage upon reaching the end of their path. This will be denoted with a color change on their sprite, as all enemy sprites will look significantly different from each other.

1) Invading Cells—the most basic unit. It will simply travel down the path until it is killed or reaches the end. It has low health, and movement speed in addition to inflicting low damage. Their strength is in their numbers.

2) Converter Cells—These cells are slow and bulky. They have a high amount of health but do not attack. However, overtime they have the ability to convert a nearby player macrophage or Neutrophil into a "Small Converted Cell". These are targeted by Natural Killer Cells and marked by B Cells.

3) Converted Cell—These cells are turned from player Macrophage by a Converter Cell. They share all of the statistics that a Macrophage has originally. These are targeted by Natural Killer Cells and marked by B Cells.

4) Large Converted Cell—These cells are like the Small Converted Cell, except they are bigger and move a little slower. Additionally, they have more health and a slower attack speed. These are targeted by Natural Killer Cells and marked by B Cells.

5) Multicellular Parasites (working name)—These cells come in a group of cells which form a straight line. They move very slowly, but each cell in the line can attack freely of each other. Each cell has low health but a high attack rate.

ATP: IW 20 In-Game Currency

As mentioned previously, Adenosine Triphosphate, commonly known as ATP, is often referred to as "the molecular unit of currency" of intracellular energy transfer. Therefore, it is fitting that ATP is the main form of currency in the IW 20 game and is used by the player to upgrade or purchase cell spawners, hereinafter known as "towers."

The player automatically starts out with a set amount of ATP at the beginning of each mission;

The amount of ATP gained at the start of a level differs based on the level;

ATP is automatically generated over time once the level has started;

Completing a wave of enemies will reward the player a set amount of ATP;

Killing an enemy will reward the player ATP based on the type of enemy killed.

By acting as IW 20's game currency, the following game features involve ATP:

Placing structures costs ATP;

Upgrading structures costs ATP;

For each round, the player starts with just enough ATP to set up a basic defense;

ATP is earned by defeating enemies;

More powerful enemies will reward player with more ATP when defeated;

More powerful structures cost more ATP.

Waves in IW 20

Waves will spawn at the beginning of a level once the player has decided they are done placing towers and press the "begin invasion" button.

Purchasing towers/creating units is possible both during and in between waves;

If all enemies in a wave have not been eliminated after a set time period depending on the difficulty of the wave, a new wave will spawn, overlapping with the first;

Waves will contain enemies respective to the difficulty but will begin to ramp up as time goes on. Early levels will hardly ever reach any of the more advanced units, whereas the difficulty of later levels will be increased with the inclusion of tougher and an increased number of enemy units;

There is a resource bonus upon successfully completing each wave; and

Players will have an option to play the game in a faster mode, speeding up all aspects of the game, including wave spawn times and the rate at which enemies move.

Immunity Game Interactive Video Game (IW) 20 Rules

Basic Rules

Invading micro-organisms move along predetermined path within the human body attempting to reach a certain point;

Goal of the player is to prevent enemies from reaching the end of the path and fighting of the infection;

Player must place defensive "structures" which will hinder or stop enemies progress;

If enough invaders reach the end of their path, the player fails in preventing the infection and must restart the level;

If the player prevents enough enemies from reaching the end, the player successfully prevents an infection and progresses to the next level;

Levels become progressively more difficult as the infection spreads to different parts of the body;

The player is given more tools to achieve success as the difficulty increases. Different aspects of the immune system are given to the player to help fight infections; and Success lies in using the available tools of the immune system most efficiently.

User Interface of IW 20

Figure 13:
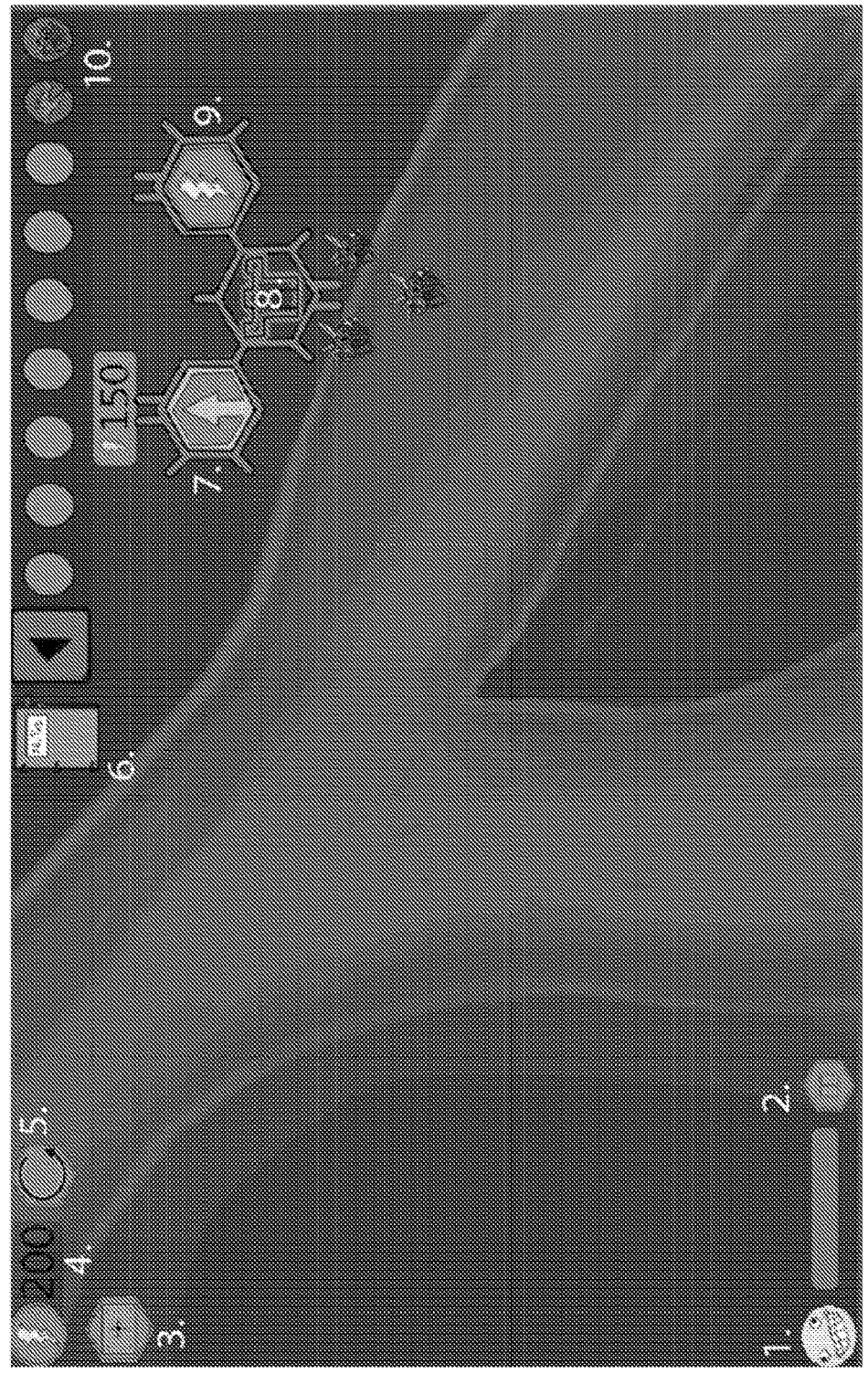
FIG. 13 depicts an exemplary screen shot of an aspect of the User Interface (UI) of the IW.
Figure 14:
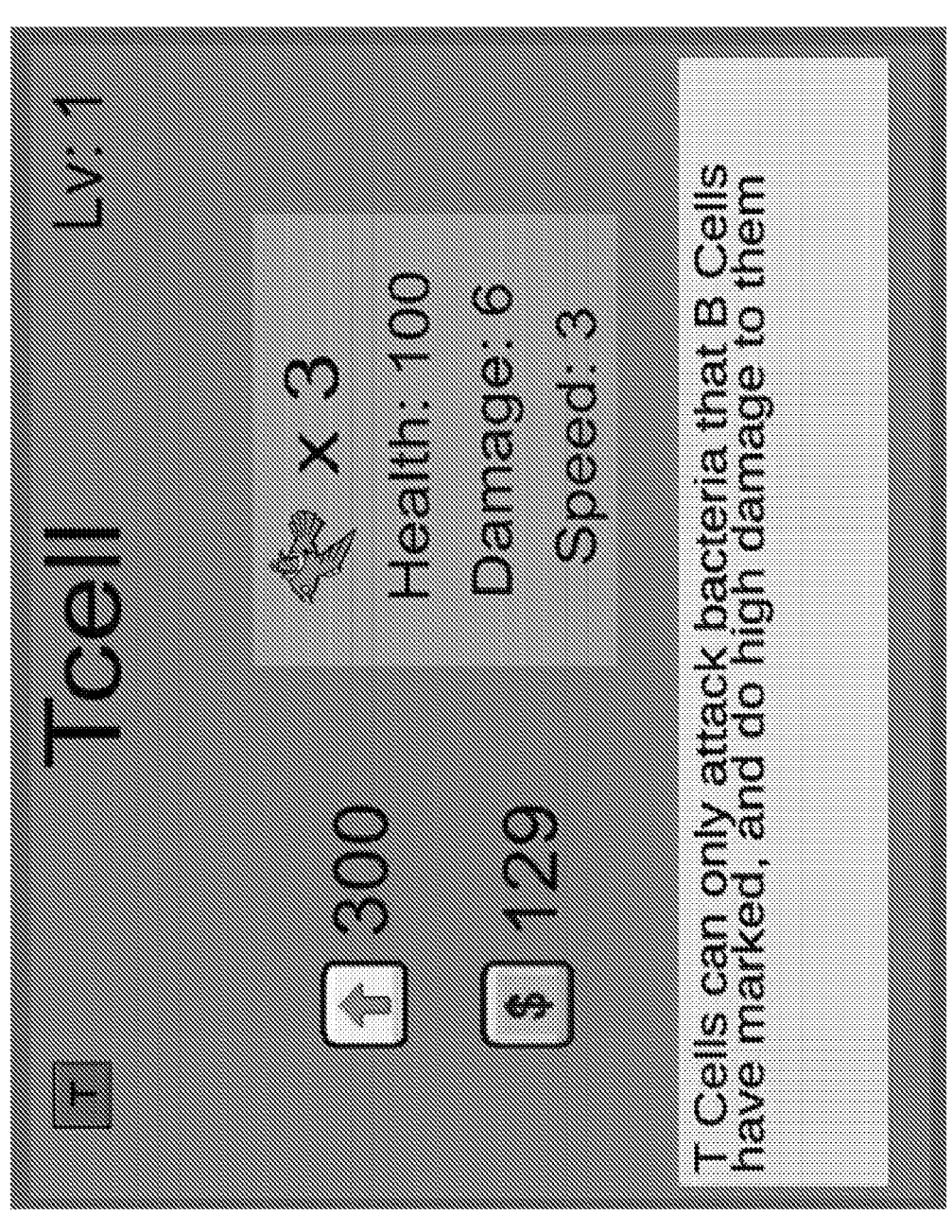
FIG. 14 is an exemplary screen shot showing a "unit panel" of a side menu of a player's device.

FIG. 13 depicts an exemplary screen shot of an aspect of the User Interface (UI) of the IW 20. A portion of the human's blood vessel, showing a branch is depicted with the following functions:

1. Health Indicator
2. Pause Button
3. Re-Center Button
4. Current Player ATP
5. Restart Button
6. Notebook
7. Upgrade Unit
8. Defensive Unit
9. Sell Unit
10. Unit Selection FIG. 14 is an exemplary screen shot showing a "unit panel" of a side menu of a player's device. The player is currently inspecting a T Cell tower and from this menu the player can assess:

(a) how many units this tower spawns (×3); (b) how much health each unit has (100); (c) how much damage each unit does (6); (d) the speed of each unit (3); (e) how much it costs to upgrade the tower (300); (f) how much the player will earn back from selling the tower (129); (g) the tower's current level (1); and (h) the name of the tower, which in this case is a "T Cell."

Figure 15:
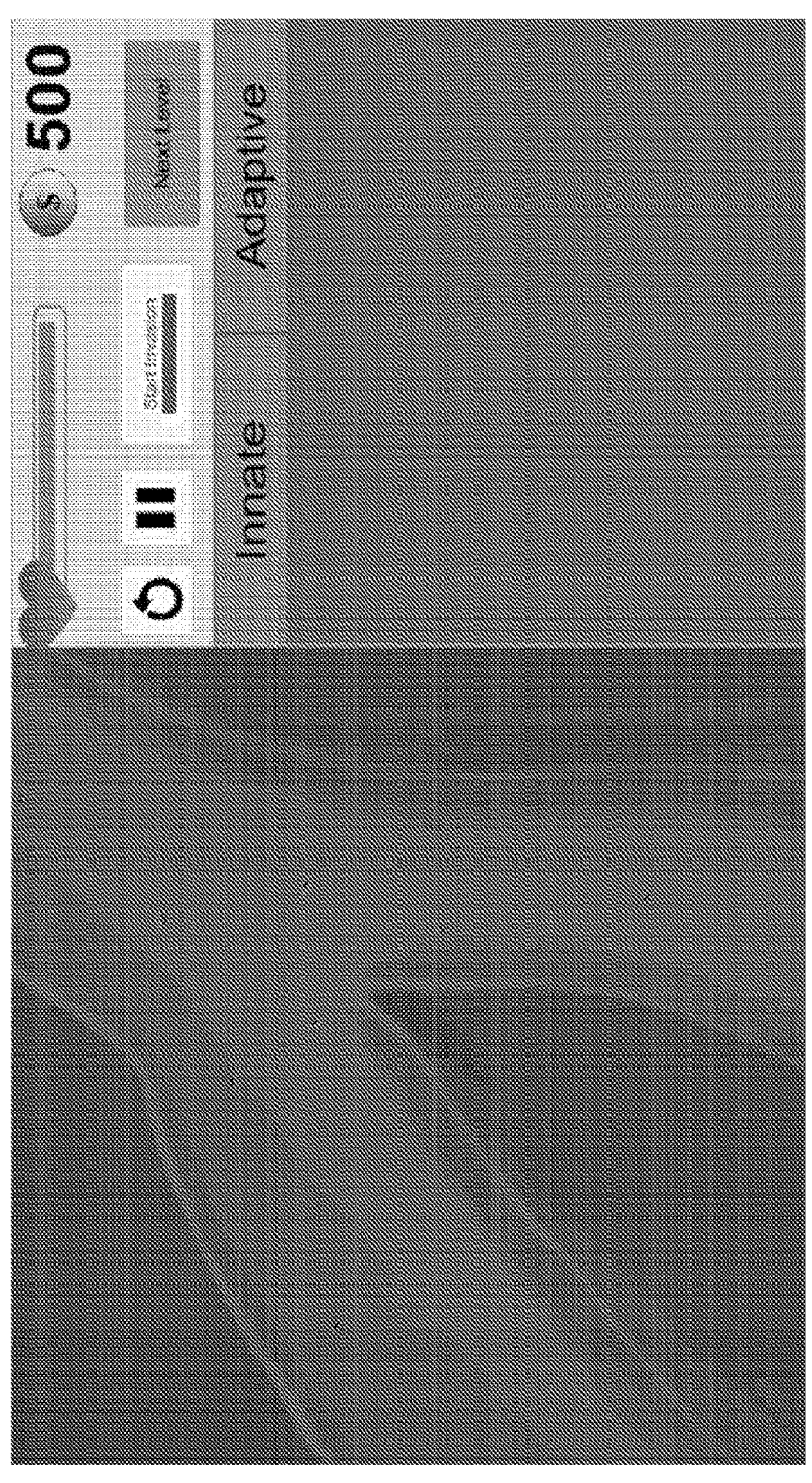

FIG. 15 is an exemplary screen shot showing before the wave begins, the player can view the direction the blood cells are flowing in order to determine which sections of the level the invading cells will come from. There is a button on the side panel which states "Start Invasion" which must be pressed after the player has built their towers and is ready to begin the level. There are buttons to reset the camera's view and next to it a button to pause the action. In the top right, is a number to represent the player's currency acquired from defeating enemy units and will be required to build towers. Next to it is the player's health which must be preserved to beat the level. The Innate and Adaptive tabs hold various towers which the player can purchase and place within the level to stop invading enemy units.

Figure 16:
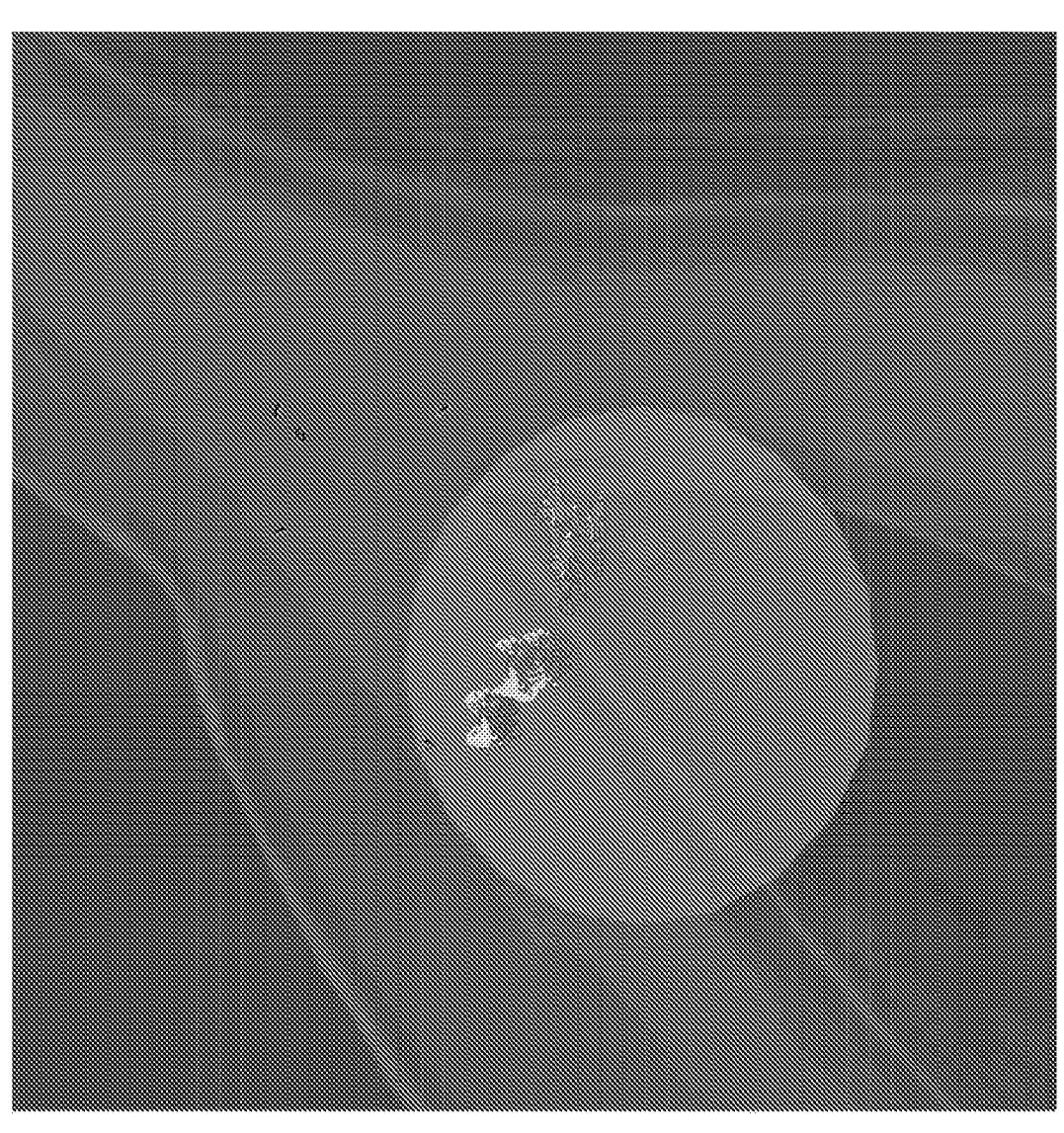
FIG. 16 is an exemplary screen shot depicting a group of B Cells and T Cells waiting for invading cells in the blood stream.

FIG. 16 depicts a group of B Cells and T Cells waiting for invading cells in the blood stream. The green circle demonstrates the wide range of vision the B Cells have. The blue circle represents the B Cell units' tower while the red circle represents the T Cell units' tower.

Figure 17:
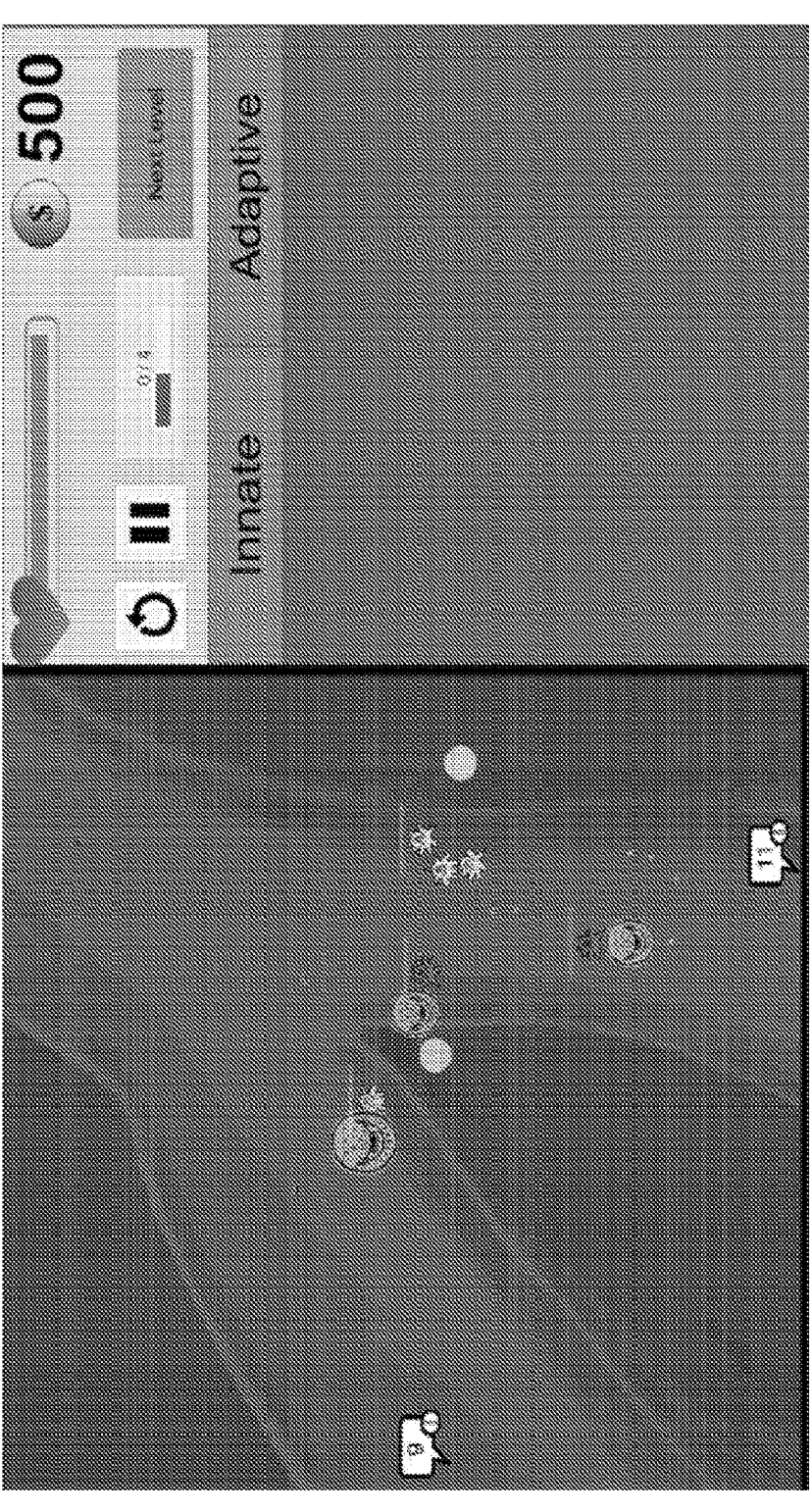
FIG. 17 is an exemplary screen shot showing that once the wave has started, the player's units will battle with invading cells if they are within the tower's range.

FIG. 17 is an exemplary screen shot that once the wave has started, the player's units will battle with invading cells if they are within the tower's range. Enemy/player units receiving damage will flash red. There are icons in each lane of the level to indicate how many more enemy units the player should expect from that direction.

Figure 18:
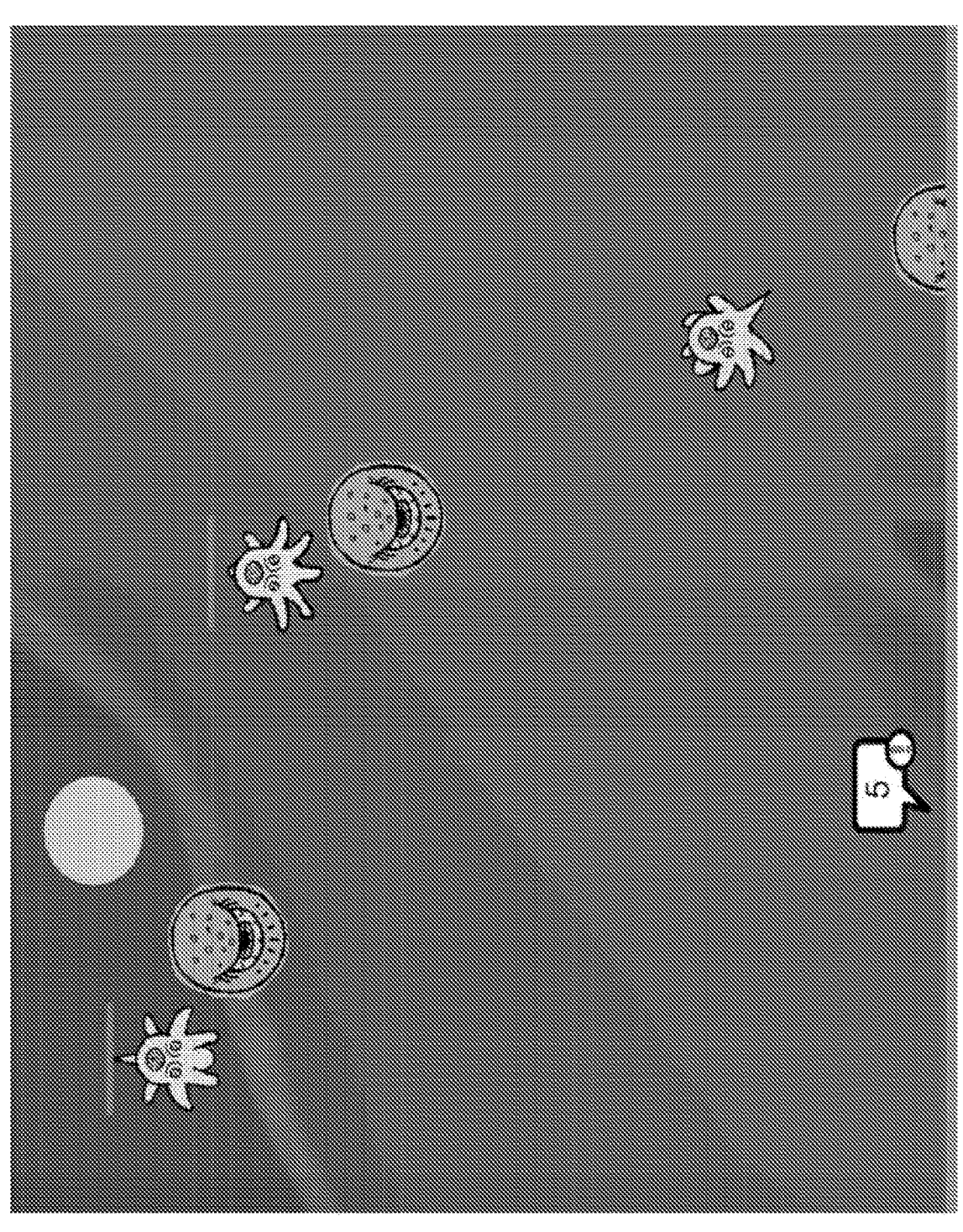
FIG. 18 is an exemplary screen shot of a closeup of Invader (e.g., Bacteria) cells fighting with Macrophages.

FIG. 18 is an exemplary screen shot of a closeup of Invader (e.g., Bacteria) cells fighting with Macrophages. Cells will fight one on one with the survivor being roped into another battle if it is within the tower's range. The blue circle represents the Macrophage units' tower.

Covi Fighters Interactive Video Game (CF) 200

Figure 19A:
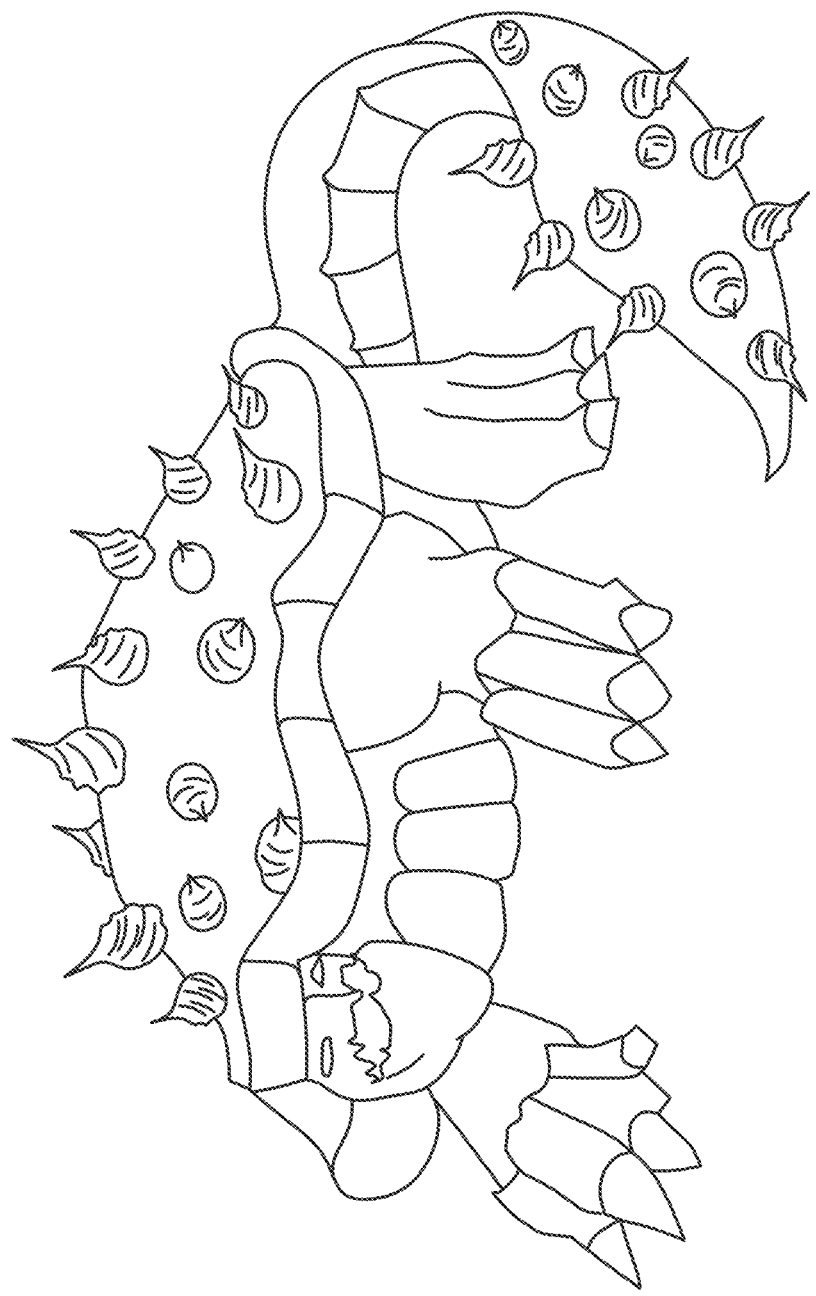
FIG. 19A is an exemplary video graphic of Covid-19 as used in the Covi Fighters (CF) Interactive Video Game.
Figure 19B:
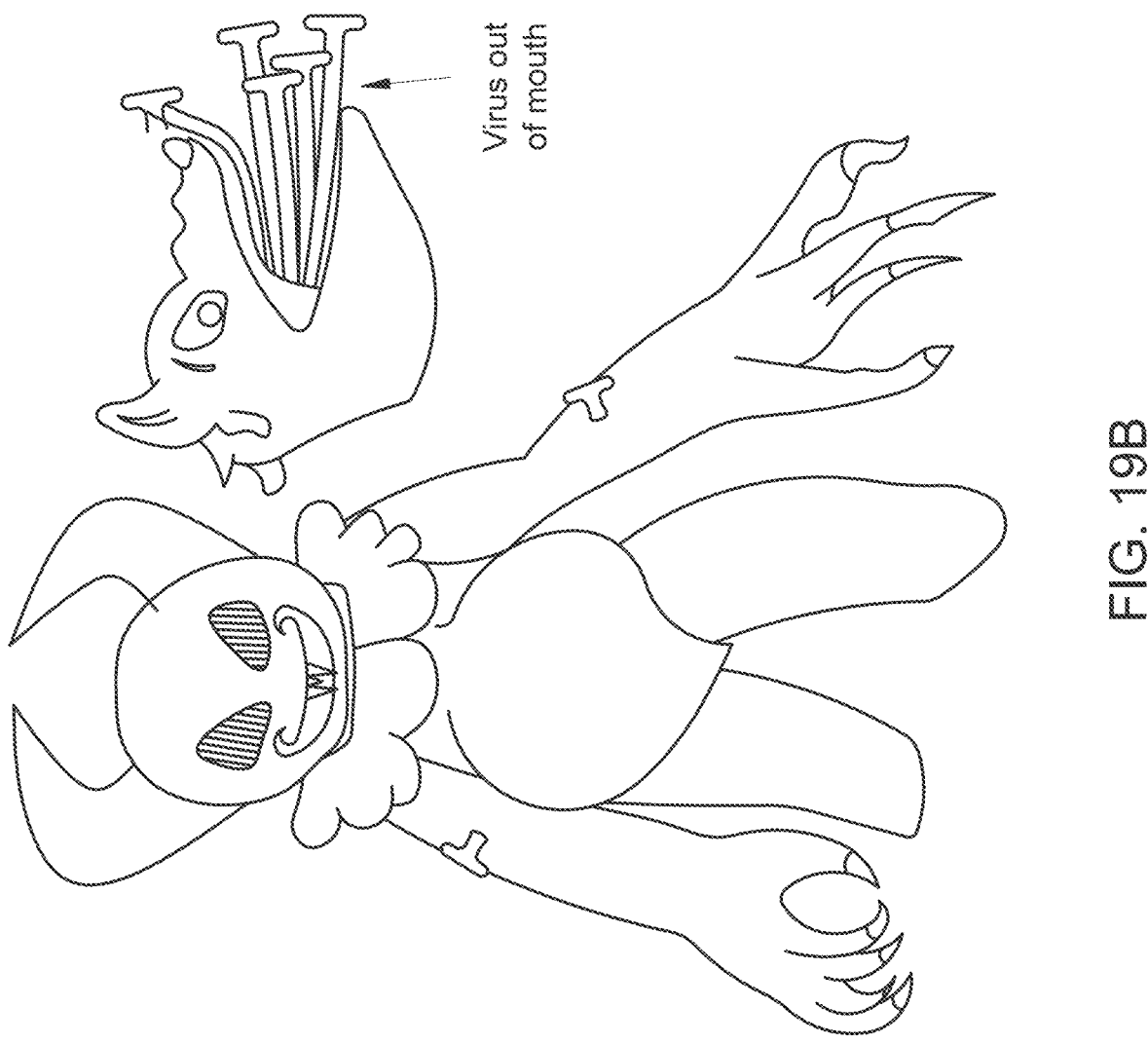
FIG. 19B is an alternative exemplary video graphic of Covid-19 as used in the CF.
Figure 19C:
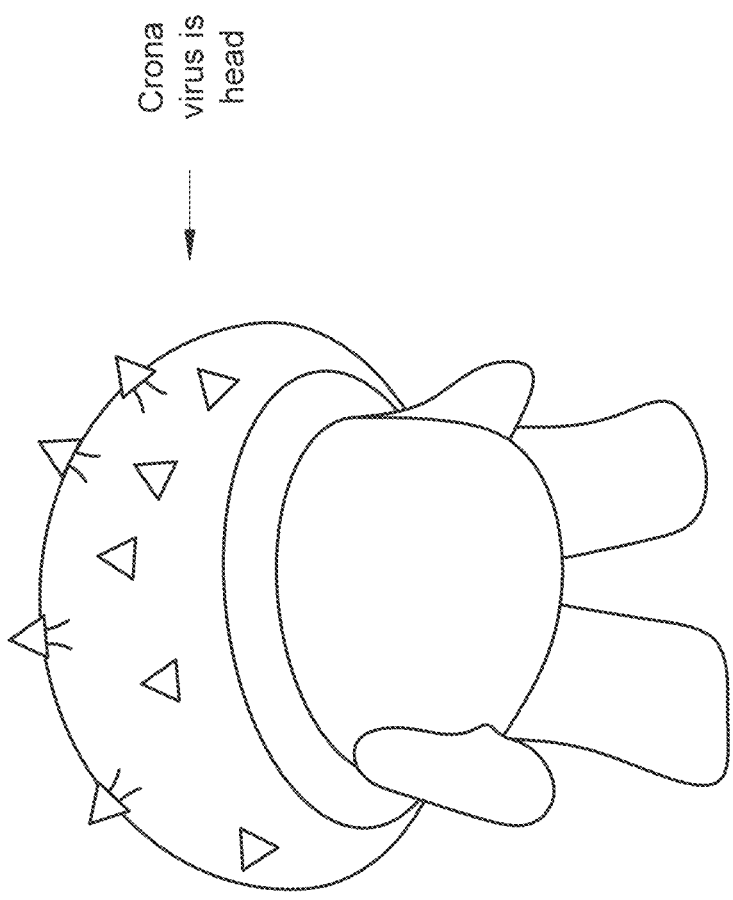
FIG. 19C is a further alternative exemplary video graphic of Covid-19 as used in the CF.

The Covi Fighters Interactive Video Game (CF) 200 is nearly identical to the IW 20 except with regard to the Enemy types and the Friendly Units. In particular, in CF 200, there is only one Enemy type: Covid-19, having an exemplary video graphic shown in FIG. 19A; FIGS. 19B-C depict respective alternative video graphics for Covid-19. As for the Friendly Units in CF 200, they comprise Macrophages (antigen-presenting cells, APCs, take virus to B or T Cells to target), B Cells and T Cells.

Figure 20:
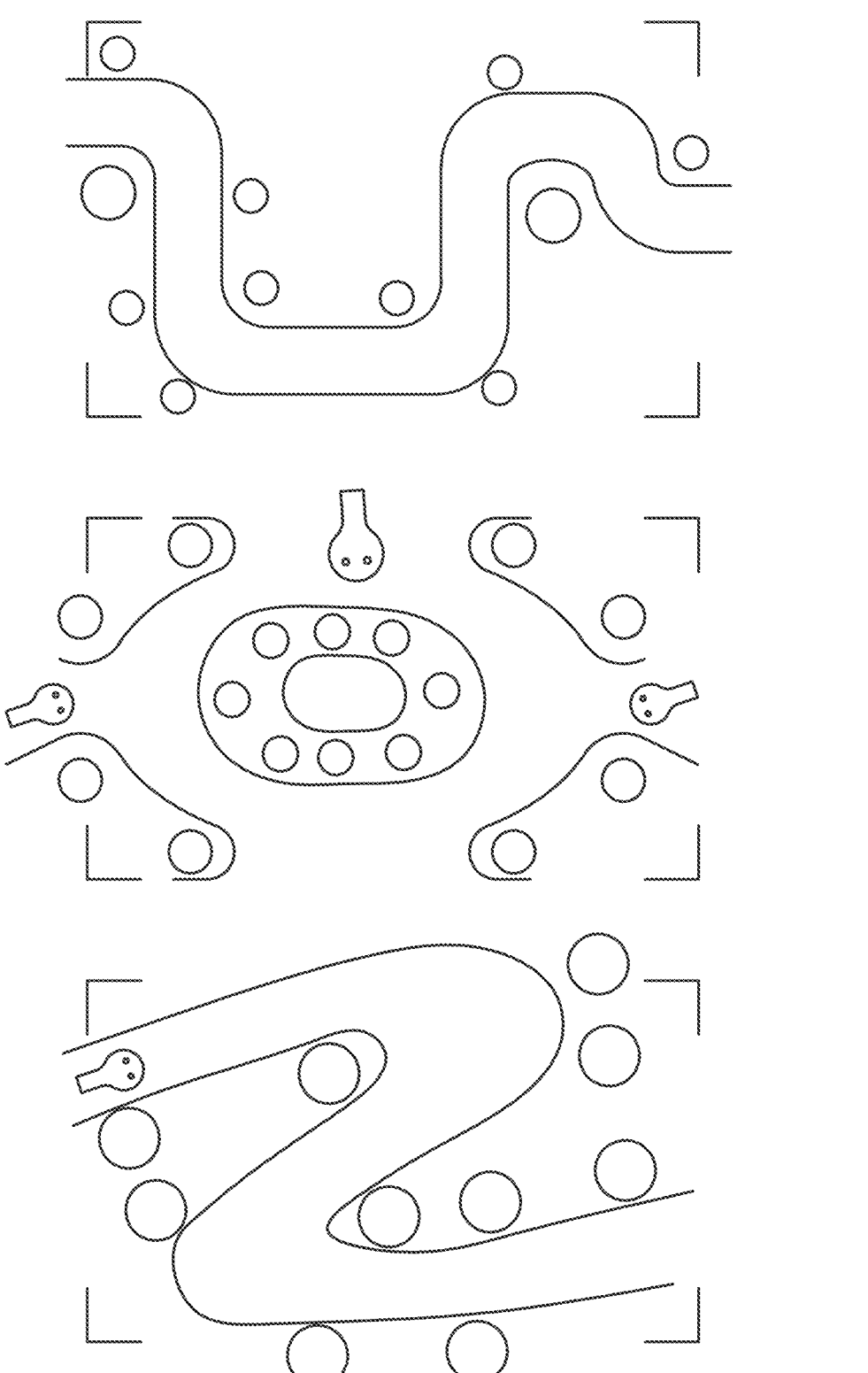
FIG. 20 is an exemplary game map for CF, depicting, by way of example, Covid-19 cells fighting with Macrophages.

FIG. 20 is an exemplary game map for CF 200, depicting, by way of example, Covid-19 cells fighting with Macrophages.

It should be noted that the towers in IW 20 and CF 200 generate cells, not antibodies; antibodies are produced by B Cells only.

It should be further noted that viruses are not considered to be cells; rather, they are non-living particles that infect cells. Moreover, Bacteriophages in the IW 20 are considered in this game as viruses that can infect invading bacteria to kill them.

It should be noted that it is within the broadest scope of the invention 20 and 200 that besides having players strategize in the placement of Friendly Units in a particular virtual human body environment, individual players can assume the role of particular Enemy Units or Friendly Units wherein a group of remotely-located players are playing IW 20 or CF 200 within a common virtual human physiology.

While the invention has been described in detail and with reference to specific examples thereof, it will be apparent to one skilled in the art that various changes and modifications can be made therein without departing from the spirit and scope thereof

What is claimed is:

1. An interactive video game system for educating at least one player about organism immunity to toxins or infections using a video game, said video game system comprising:

a video game server and associated database, said server comprising a processor which executes software stored on said database to generate and control a virtual human body representation including virtual organs, a virtual immunity system with virtual cells, virtual organisms, virtual toxins, and virtual viruses that have invaded the virtual human body representation, said virtual organisms, toxins and viruses configured to interact in a manner that mimics a human body's immune system response; and at least one player computer device having a display screen and a user interface to permit the at least one player to interact with the video game server to configure the virtual immunity system generated by said video game server to stop an attack by said invaders and to score points based on how successful the at least one player is in stopping said attack;

wherein the video game server configured to generate and control the virtual human body representation is configured to:

cause the at least one player computer device to present a graphic user interface on the display screen, including to present the virtual human body representation with the virtual organs, determine a virtual set of pathogens selected from the virtual organisms, virtual toxins, and virtual viruses, and respective locations of invading virtual pathogens, from the set of pathogens, in the virtual human body representation, receive user input data representing a virtual immune defense strategy comprising a virtual set of immunity system cells, of one or more immunity system cell types, and locations in the virtual human body representation in which to deploy the virtual set of immunity system cells, wherein the user input data is determined by the at least one player based, at least in part, on educational information provided by the server to the at least one player computer device regarding the pathogens and immunity cell types, compute and present on the display screen of the at least one player computer device a video of the deployed virtual set of immunity system cells battling the invading pathogens as the invading pathogen traverse respective paths in the virtual human body representation, and determine the score points based on success of the virtual set of immunity system cells in counteracting the invading pathogens during traversal of the respective paths in the virtual human body representation by the invading pathogens, wherein the success of the virtual set of immunity system cells in counteracting the invading pathogens is determined according to characteristics respectively associated with the set of immunity system cells and the set of pathogens.

2. The interactive video game system of claim 1 wherein the at least one player uses predetermined structures to configure the virtual immune system.

3. The interactive video game system of claim 2 wherein said predetermined structures comprise virtual graphic representations of at least one from the group of macrophages, neutrophils, basophils, eosinophils, natural killer cells, dendritic cells, bacteriophages, T cells and B cells.

4. The interactive video game system of claim 3 wherein each of one in said group comprises characteristics for attacking said invaders, said characteristics comprising speed, damage ability and range.

5. The interactive video game system of claim 4 wherein each one of said group characteristics further comprises attack speed, attack mode, power and the ability to respawn.

6. The interactive video game of claim 3 wherein each one in said group comprises a price that the at least one player must pay to utilize when configuring the virtual immune system.

7. The interactive video game of claim 6 wherein said payment is achieved with accumulated virtual ATP (Adenosine Triphosphate) earned by defeating said invaders.

8. The interactive video game of claim 6 wherein each one in said group can be upgraded by the at least one player by paying a predetermined virtual ATP price.

9. The interactive video game of claim 1 wherein said invaders comprises one from the group of invading cells, converter cells, converted cells, large converted cells, multicellular parasites and Covid-19 cells.

10. The interactive video game of claim 1 wherein said at least one player computer device is one from the group of computer workstations, laptops or mobile devices.

11. The interactive video game system of claim 1, wherein the user input data is determined by the at least one player further based on the set of pathogens presented on the virtual human body representation, and available energy, constraining selection by the at least one player of the immunity system cells.

12. A method for educating at least one player about organism immunity to toxins or infections using an interactive video game, said method comprising:

providing a video game server and associated database, said server comprising a processor which executes software stored on said database for generating and controlling a virtual human body representation that includes virtual organs, a virtual immunity system with virtual cells and organisms, virtual toxins, and virtual viruses that have invaded the virtual human body representation, said virtual organisms, toxins and viruses configured to interact in a manner that mimics a human body's immune system response;

connecting at least one end user computer device, having a display screen and a user interface, over a network to permit the at least one player to interact with the video game server; and configuring a virtual immunity system generated by said video game server to stop an attack by said invaders and to score points based on how successful the at least one player is in stopping said attack;

wherein generating and controlling the virtual human body representation comprises:

causing the at least one player computer device to present a graphic user interface on the display screen, including to present the virtual human body representation with the virtual organs, determining a virtual set of pathogens selected from the virtual organisms, virtual toxins, and virtual viruses, and respective locations of invading virtual pathogens, from the set of pathogens, in the virtual human body representation, receiving user input data representing a virtual immune defense strategy comprising a virtual set of immunity system cells, of one or more immunity system cell types, and locations in the virtual human body in which to deploy the virtual set of immunity system cells, wherein the user input data is determined by the at least one player based, at least in part, on educational information provided by the server to the at least one player computer device regarding the pathogens and immunity cell types, computing and present on the display screen of the at least one player computer device a video of the deployed virtual set of immunity cell system battling the invading pathogens as the invading pathogen traverse respective paths in the virtual human body representation, and determining the score points based on success of the virtual set of immunity system cells in counteracting the invading pathogens during traversal of the respective paths in the virtual human body by the invading pathogens, wherein the success of the virtual set of immunity system cells in counteracting the invading pathogens is determined according to characteristics respectively associated with the set of immunity system cells and the set of pathogens.

13. The method of claim 12 wherein the step of configuring comprises the at least one player his/her associated computer device to position predetermined structures within the virtual human body.

14. The method of claim 13 wherein said predetermined structures comprise virtual graphic representations of at least one from the group of macrophages, neutrophils, basophils, eosinophils, natural killer cells, dendritic cells, bacteriophages, T cells and B cells.

15. The method of claim 14 wherein each of one in said group comprises characteristics for attacking said invaders, said characteristics comprising speed, damage ability and range.

16. The method of claim 15 wherein each one of said group characteristics further comprises attack speed, attack mode, power and the ability to respawn.

17. The method of claim 14 wherein each one in said group comprises a price that the at least one player must pay to utilize when configuring the virtual immune system.

18. The method of claim 17 wherein said payment is achieved with accumulated virtual ATP (Adenosine Triphosphate) earned by defeating said invaders.

19. The method of claim 17 wherein each one in said group can be upgraded by the at least one player by paying a predetermined virtual ATP price.

20. The method of claim 12 wherein said invaders comprises one from the group of invading cells, converter cells, converted cells, large converted cells, multicellular parasites and Covid-19 cells.

21. The method of claim 12 wherein said at least one player computer device is one from the group of computer workstations, laptops or mobile devices.

* * * * *